June 22, 1971    F. R. VAN VLEET ET AL    3,586,566

PROCESS OF ENCAPSULATING AN O-RING

Filed Sept. 19, 1968    3 Sheets-Sheet 1

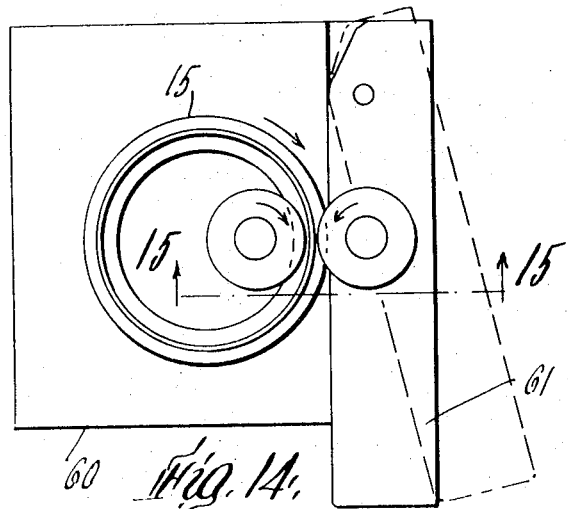
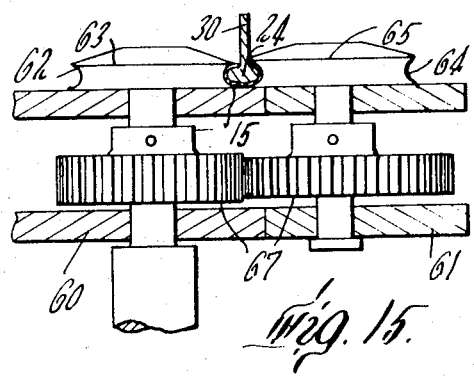
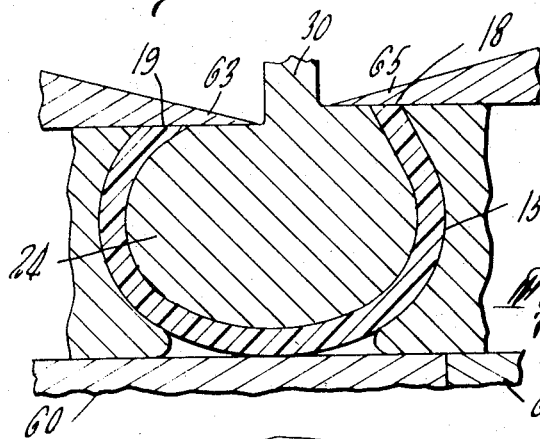
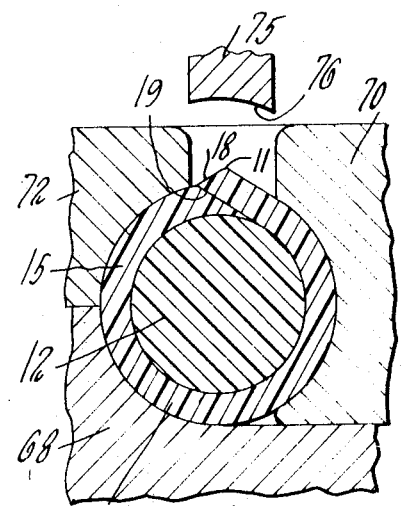
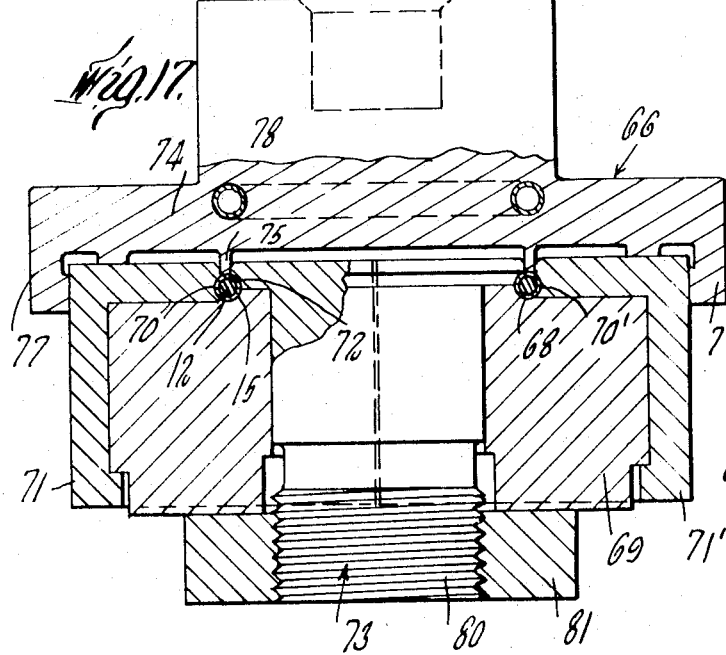

United States Patent Office 3,586,566
Patented June 22, 1971

---

3,586,566
PROCESS OF ENCAPSULATING AN O-RING
Frank Roy Van Vleet, North Reading, and David Gilbert Way, Boxborough, Mass., assignors to A. W. Chesterton Company, Everett, Mass.
Continuation of application Ser. No. 499,179, Oct. 21, 1965. This application Sept. 19, 1968, Ser. No. 760,825
Int. Cl. B32b *31/04*
U.S. Cl. 156—293         7 Claims

ABSTRACT OF THE DISCLOSURE

This disclosure relates to a novel process and apparatus for encapsulating an O ring, as well as a composite O ring. In general, the encapsulating process of the invention consists of forming a continuous C shaped cover band, inserting an O ring core therein and sealing the band edges together to complete the encapsulation.

The core forming process comprises conforming plastic sheet material to the undercut portion of a mold pressurizing the outer surface of the sheet material while retracting the mold, providing a formed article having separate portions connected by a C-shaped deformation. The forming apparatus has a base and female member, including a pressure chamber, relatively movable together and a male mold slidably mounted in the base having undercut portions thereadjacent. Trimming apparatus for the article and a sealing press for completing the encapsulation process are also disclosed.

The composite O ring provided is characterized by a cover having a single overlapping heat seal joint around a single axially facing side thereof.

---

This application is a continuation of application Ser. No. 499,179, filed Oct. 21, 1965, now abandoned. Its invention relates to a novel process for encapsulating an O-ring as utilized in combination with a pair of opposed surfaces to be sealed. More particularly, this invention relates to an intermediate article of organic thermoplastic sheet material from which an encapsulating cover for an O-ring may be obtained and to the process for molding and fashioning articles of this general character and for encapsulating such an O-ring therewith, and also an O-ring.

O-rings are such well-known articles of commerce that the precise standards and specifications to which they must be manufactured are generally not appreciated. For example, O-ring sizes are generally standard within predetermined tolerances and the dimensions of the groove or the like into which they are to be inserted are selected in accordance with predetermined compression requirements, etc. This not only results in the unstressed cross section dimension of the O-ring frequently being substantially larger than that of the groove, but also requires that the O-ring have a high degree of cross sectional resilience for proper fit to provide the requisite degree of sealing over a relatively wide range of conditions. Under these circumstances, the flexibility and resilience requirements are such that the choice of material is quite limited to truly elastomeric, rubbery materials.

In commercial practice, however, O-rings are used extensively in contact with fluids for sealing. Typical uses include those wherein the O-ring is used for dynamic sealing and is positioned between opposing cylindrical surfaces which move relatively to one another, such as piston rings, piston rod packings, internal packings in shafts, and seals on pumps. They are also used for static applications, wherein the O-ring may be clamped between opposing surfaces, such as in pipe flanges and as gaskets to seal pump glands to housings. Both of such applications are shown, for example, in Pat. Nos. 3,184,244 and 3,188,095. Unfortunately, O-ring materials having the required degree of resilience without exception cannot be used in sealing a rather wide range of fluids, since they are chemically attacked and destroyed by them.

With this apparent dilemma in mind, a host of experimenters have attempted to produce an O-ring suitably resistant to chemical attack yet meeting all the dimensional, resilience and configuration requirements of O-ring seals. In general, such efforts have taken the form of inert coatings or coverings for conventional O-rings by chemically resistant organic plastic materials. These prior efforts have, however, without exception been failures for three principal reasons: (1) because of their inability to obtain a perfectly fluid tight seal without overlapping the sealing edges and hence distorting the cross sectional configuration of the thus encapsulated O-ring; (2) because of their inability to obtain a cover or coating of the proper stable configuration of substantially uniform thickness throughout for obtaining the degree of concentricity and dimensional integrity required when placed on an O-ring; and (3) because of their inability to withstand the wear and distortion of both dynamic and static seal applications. It is to these problems that the present invention is directed.

It is a principal object to provide a process suitable for forming an article of sheet material from which an encapsulating O-ring cover may be formed in accordance with the foregoing requirements.

The forming process of this invention for forming the O-ring cover comprises, broadly, conforming organic thermoplastic sheet material to the undercut portion of a mold positioned in a depression formed in such sheet and features pressurizing the outer surface of the sheet material about the depression and retracting the mold while the depression is pressurized to allow the sheet to collapse about the mold.

Other objects, features and advantages of this invention will be apparent to those skilled in the art from the following detailed description of preferred embodiments thereof together with the accompanying drawings in which:

FIG. 14 is a plan view of trimming apparatus utilized to fashion the O-ring cover of FIG. 8;

FIG. 15 is an enlarged fragmentary sectional view of the apparatus of FIG. 14 taken along the line 15—15 thereof;

FIG. 16 is an enlarged fragmentary sectional view of the apparatus of FIG. 15 showing the trimming operation in greater detail;

FIG. 17 is a sectional elevation of apparatus for sealing the encapsulated O-ring; and FIGS. 18 and 19 are enlarged fragmentary sectional views of the apparatus of FIG. 17 showing successive steps in the sealing of the O-ring cover to provide the seal around one axially facing side thereof.

According to the invention, it is by the use of an endless band of a flexible smooth surfaced film material, of uniform thickness within close tolerances, and bondable to itself preferably solely by its own substance by heat and pressure sealing of a single overlapping joint of substantial angular extent for a prefectly fluid tight seal around the entire periphery of one axially facing side of the O-ring, leaving its I.D. and O.D. surfaces entirely free of joints, that composite O-rings of truly circular cross section may be provided. With such a ring, in dynamic applications, the joint is spaced between the cylindrical opposing surfaces to be sealed but out of contact therewith to prevent wear, while in static applications, it is positioned in contact with one of the opposing planar surfaces to limit distortion stress, providing optimum joint positioning for each of the applications.

Figure 2:
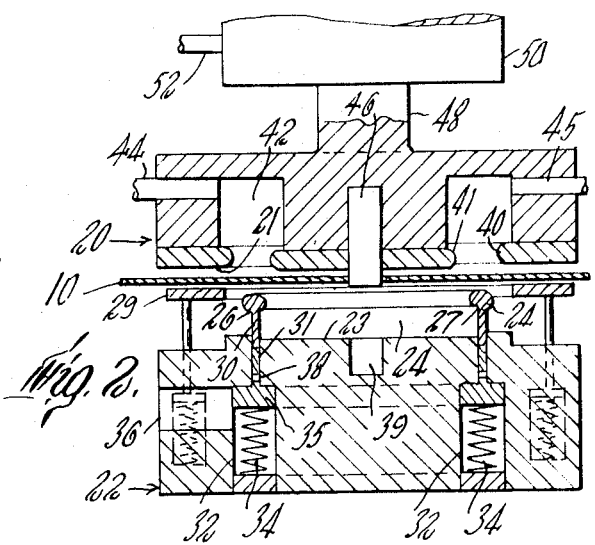
FIG. 2 is a sectional elevation of a preferred form of apparatus of this invention.

The forming apparatus used in the first step of the encapsulation process, i.e. forming a continuous C-shaped band in sheet material, as shown in FIG. 2, comprises a pair of members 20, 22 movable together for forming an article.

Base member 22 supports a male mold 24 about which it is desired to form a sheet 10 of deformable material. Typically male mold 24 has curved undercut portions 26, 27 generally facing the base portion 22 and into which it is desired to force sheet 10.

Ring mold 24 has a skirt 30 at undercut portions 26, 27 which is demountably, slidably positioned at right angles to the plane of ring 24 in annular slot 31 in base 22, extending therefrom outwardly toward female member 20. In its most extended position skirt 30 supports ring 24 away from base 22 sufficient distance to extend well within female member 20 when the dies are closed at a point beyond lips 40, 41 of pressure chamber 42. Skirt 30 supports ring 24 in female member a distance at least sufficient to permit sheet 10 to form fully thereabout within female member 20 with skirt 30 retracted.

In the illustrated preferred embodiment for forming O-ring covers, mold 24 comprises a ring of generally circular cross section about which sheet 10 is formed—ring 24 being of approximately the same general inner dimension as the O-ring core 12 to be covered. Also in the preferred embodiment, most clearly illustrated in FIG. 16, the ring mold 24 is asymmetrical in section to provide for a suitable scarf joint for the O-ring cover to be formed. Also the curved undercut portions 26, 27 terminate before coming around full circle to permit appropriate cutting for a suitable scarf joint (FIG. 16) as will be explained further on.

Also provided in the base 22 aree means for moving and holding skirt 30 in its most outwardly extended position as in FIGS. 2–5 until a predetermined pressure is applied thereto greater than that required for initially deforming the sheet of material 10 by movement of the members 20, 22 together. In the illustrated preferred embodiment such means comprise spring means 34 biasing a support member 35 on which skirt 30 is demountably positioned outwardly toward the female member 20.

Figure 3:
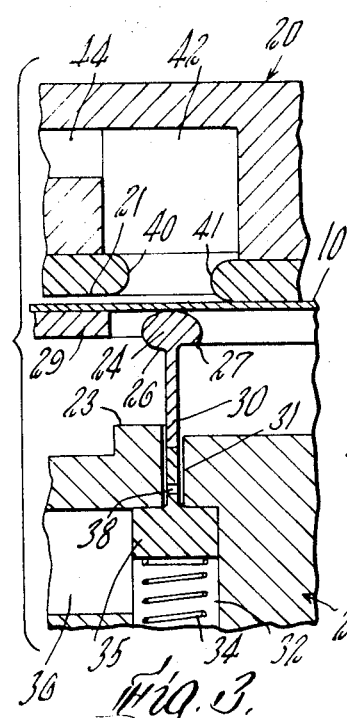
FIGS. 3–6 are enlarged fragmentary sectional elevations of the apparatus of FIG. 2 illustrating successive steps in the operation thereof and in the process of this invention.
Figure 4:
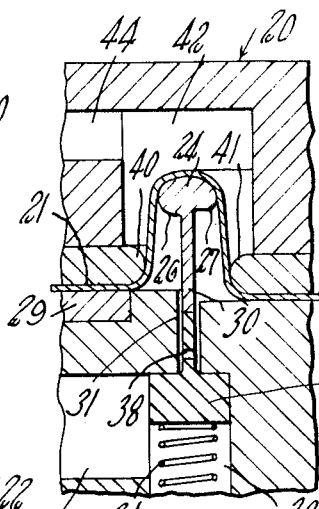

A peripheral spring loaded pressure plate 29 adapted for movement between a position remote from base 22, FIGS. 2 and 3, with its upper face in a plane about that of mold 24, FIG. 2, and a position with its upper face flush with the portion of clamping face 23 of base 22 outside skirt 30 is provided on the base. Plate 29 functions to clamp sheet 10 about its periphery to provide a light clamping action to prevent wrinkling of sheet 10 as members 20, 22 are advanced together.

The portion of clamping face 23 within skirt 30 is preferably in a lower plane than that portion outside the skirt.

A vent 36 is provided through base 22 communicating with chamber 32 to permit fluid to escape therefrom as skirt 30 is depressed. Likewise a vent 38 in the support 35 permits fluid to pass from the inside thereof through vent 36. Also, the fit between skirt 30 and base 22 where the skirt 30 passes therethrough is loose as shown to permit free passage of fluid therethrough when dies 20, 22 are clamped together.

Female member 20 includes pressure chamber 42 having an opening at lips 40, 41 to receive mold ring 24. The pressure chamber is substantially larger than ring 24 in depth and width and is connected via tubes 44, 45 to a source of fluid pressure (not shown). At the clamping face 21 of member 20, however, lips 40, 41 narrow the opening into chamber 42 to a size slightly larger than is sufficient to permit entry of ring 24 and sheet 10 therein. Member 20 also is provided with locating pin 46, base member 22 being provided with a corresponding hole 39 to receive pin 46.

Relative movement of members 20, 22 is provided by mounting female member 20 on a hydraulic, pneumatic or like mechanism including piston 48, cylinder portion 50, and means 52 connecting the cylinder to a source of pressurized fluid (not shown).

Figure 9:
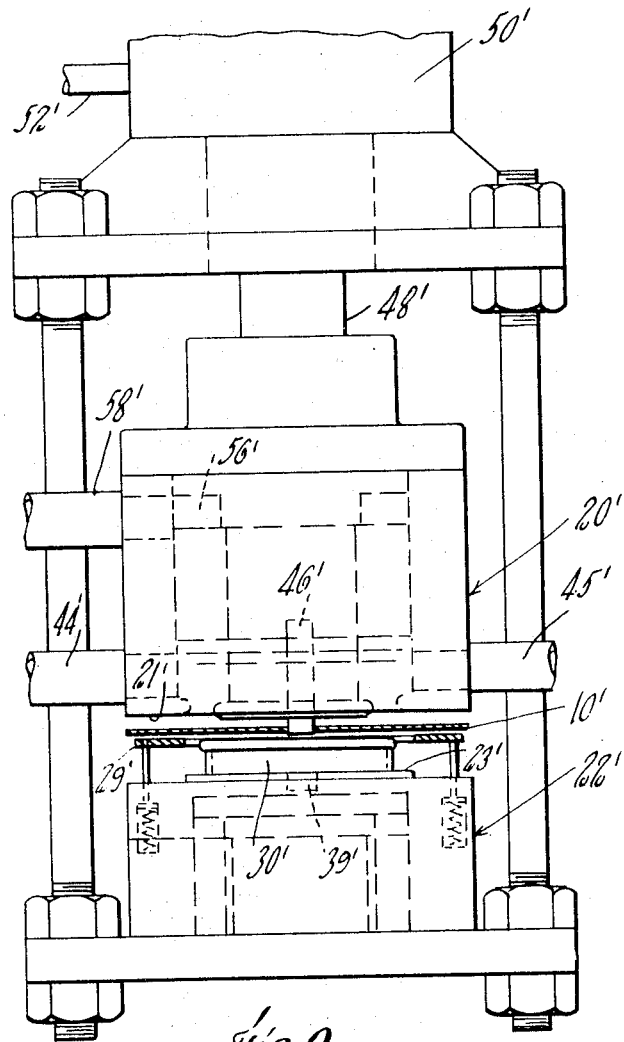
FIG. 9 is an elevation of an alternate preferred embodiment of the apparatus.

The embodiment shown in FIG. 9 is substantially identical to that already described and the elements in common are denoted by the same reference numerals having a prime designation. In addition to the foregoing, however, the embodiment of FIGS. 9–11 also includes piston 54' mounted in female member 20' about pressure chamber 42' aligned with mold ring 24'. Piston 54' is slidable in member 20' toward ring 24' for overriding biasing means 34', 35'. Above piston 54' in member 20' is a chamber 56' and tube 58' for introducing hydraulic fluid to chamber 56' for movement of piston 54'.

The forming process and operation of the apparatus involve first providing a suitable organic thermoplastic sheet material particularly where an inert O-ring cover is the desired end product.

The material of the cover is of great importance, but need not be selected for its resilience, but rather for such considerations as its resistance to chemical attack, its surface finish, its flexibility and its thermoplastic properties for forming and heat and pressure sealing. Thus, the sheet film material must be flexible. It must have thermoplastic properties for its formation as described below. It should also be readily heat sealable so that it may be sealed with its own substance to provide a perfectly fluid tight joint.

It is particularly important that the sheeted film covering be of uniform thickness within narrow limits, e.g. ±1 mil, in order to meet roundness and other tolerance requirements and present a smooth and glossy low friction surface, without machine tool or casting marks or the like. The surface needed is one such as the surface provided by the extrusion or calendering of a sheeted film at temperatures close to its melting point. Its finished thickness should be a substantial proportion of the cross section of the composite O-ring, preferably about 20 mils, with an O-ring of $\frac{1}{8}''$ across section diameter, with a tolerance of about 2–3 mils in order to provide an adequate scarf joint width for providing a perfectly fluid tight heat sealed joint.

A film material found particularly suitable for use in the invention is a fluorocarbon film made from a completely fluorinated ethylene-propylene copolymer by Du Pont and known as Du Pont Teflon FEP fluorocarbon film. Other film materials having the required properties may likewise be used.

Figure 1:
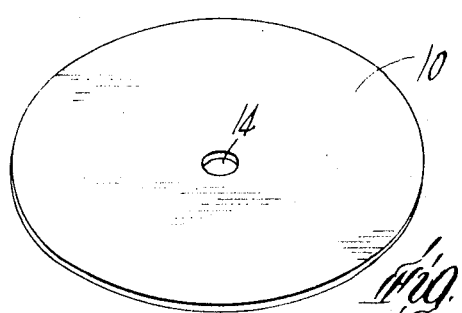
FIG. 1 is an isometric view of sheet material from which an article is to be formed.

The sheet 10 thus provided preferably has the configuration, FIG. 1, of a disc with a central locating hole 14 adapted for cooperation with locating pin 46.

The sheet is then located in the forming apparatus intermediate and spaced from male mold 24 and female member 20 on locating pin 46. The sheet 10 is then heated uniformly to a thermoforming temperature by a heated fluid thereabout.

Female member 20 is then advanced, FIG. 3, to engage sheet 10 on spring loaded pressure plate 29 with clamping face 21. As the female member 20 advances toward male die 22, sheet 10 is deformed about the portion of ring mold 24 against which it rests. Finally the sheet 10 is firmly engaged, FIG. 4, between respectively clamping faces 21, 23 of members 20, 22, and plate 29 with the sheet 10 initially deformed away from its plane in a U-shaped cross section in pressure chamber 42.

Figure 5:
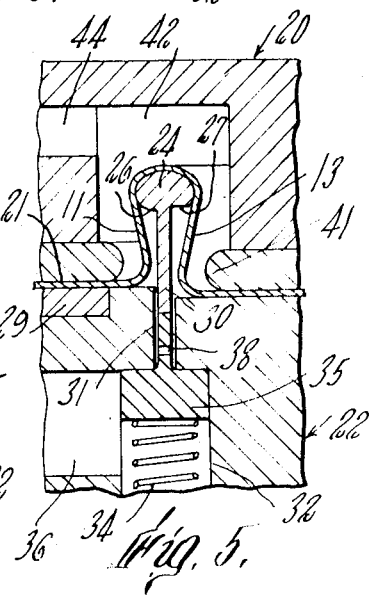
Figure 6:
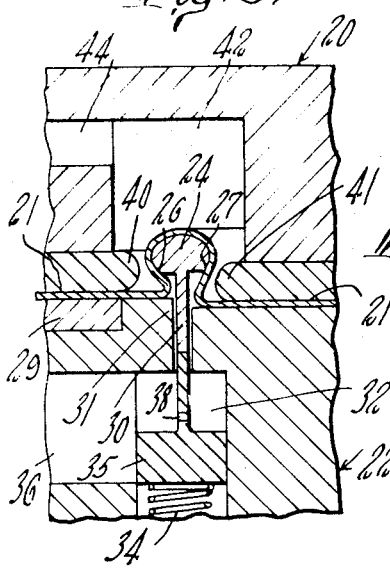

After sheet 10 is initially deformed, pressurized, heated fluid is introduced into chamber 42 sufficient to indent facing walls 11, 13 of sheet 10 toward skirt 30, FIG. 5, but not sufficient to stretch the sheet 10 to a point where it collapses and ruptures about ring 24. At this point skirt 30 is moved in chamber 32 away from female member 20 while the members 20, 22 are maintained in clamped position. As the skirt 30 is thus moved, fluid pressure forms sheet 10 into the recesses 26, 27 of ring 24, FIG. 6, any fluid entrapped on the inner portions of the sheet 10 being vented by skirt 30 through vents 36, 38. In the illustrated apparatus, FIGS. 2–6, movement of skirt 30 away from female member 20 is accomplished by raising pressure to override the bias of spring 34. Preferably the spring bias is adjusted so that the second overriding pressure in chamber 42 is just slightly greater than the first sheet indenting pressure to avoid undue additional stretching and possible rupture of sheet 10.

Figure 10:
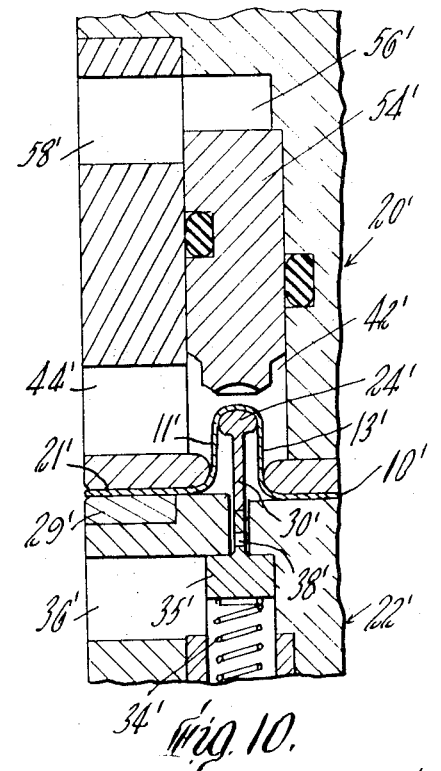
FIGS. 10 and 11 are enlarged fragmentary sectional elevations of the apparatus of FIG. 9 illustrating successive steps in the operation thereof and in the process of this invention similar to the steps shown in FIGS. 3–6.
Figure 11:
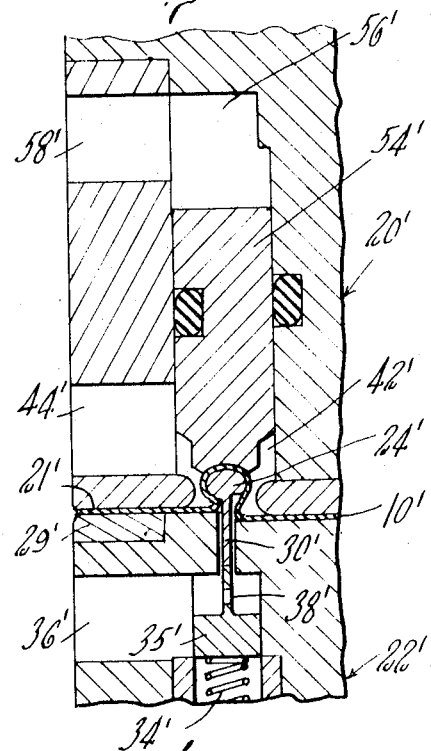

The operation of the embodiment of FIGS. 9–11 is the same as that previously described except that the second, overriding pressure is mechanical instead of fluid. Thus, after initial deformation, FIG. 10, and indentation, broken lines FIG. 10, the overriding pressure is provided by advancing piston 54' against sheet 10' at ring 24' while fluid pressure in chamber 42' is held constant, FIG. 11.

After the sheet is thus formed about the ring mold 24 sheet 10 is cooled. When sufficient cooling has taken place to insure configuration stability of the sheet material, the members 20, 22 are separated.

Figure 7:
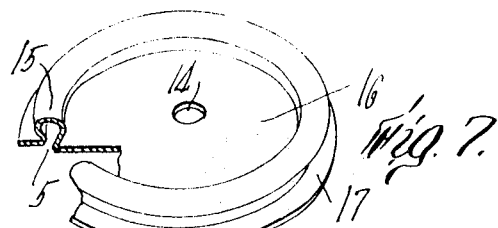
FIG. 7 is a reduced isometric view of the intermediate product obtained from the process and apparatus of the invention illustrated in FIGS. 3–6.
Figure 8:
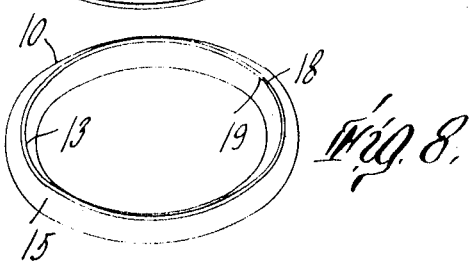
FIG. 8 is an inverted isometric view of the product of FIG. 7 with excess material trimmed away.

The formed sheet still on ring 24 is then moved from base 22 and has a configuration as shown in FIG. 7 comprising a sheet 10 in a plane having inner 16 and outer 17 portions separated by a gap 5 and connected by C-shaped portion, annular generally tubular bead or band 15. This then is the intermediate article from which the O-ring cover will be fashioned.

The second step of the encapsulation process comprises trimming the band 15 from the sheet 10.

The disk incorporating the C-shaped band 15, after cooling, is transferred on ring 24 to trimming apparatus, FIGS. 14–16.

The trimming apparatus comprises a table 60 having a lever 61 pivotally connected at a side thereof to the table 60 in a common plane therewith. A drive wheel 62 is rotatably mounted on table 60 adjacent lever 61 adapted for connection to a power source. A rotary knife 63 is fixed on the upper portion of wheel 62, for rotation therewith, spaced from table 60. A similar driven wheel 64 and knife 65 are rotatably mounted on lever 61 adjacent drive wheel 62 and knife 63, knife 65 spaced from lever 61. Gear means 67 are connected to wheels 62, 64 for transmitting driving power to driven wheel 64 and for counterrotation thereof. On movement of lever 61 away from table 60, gears 67 are disengaged. To provide positive gripping and driving of ring mold 24 and sheet 10 thereon, the configuration of the wheels 62, 64 between table 60 and knives 63, 65 conforms to the configuration of band 15 on mold 24 which is gripped between wheels 62, 64 with skirt 30 extending away from table 60.

In operation the disc on ring mold 24 is transversed to the trimming apparatus. Lever 61 is closed engaging gears 67. Power is then supplied the drive wheels and the knives readily trim the excess sheet material from band 15.

The particular angles at which band portion 15 is finally cut by knives 63, 65 whether conducted as a severing or trimming operation, are important in providing a perfectly heat sealed and fluid tight scarf joint for the O-ring cover. To accomplish this result, the ring mold 24 is of such cross-sectional configuration to support the semi-toroidal ring 15 at desired angles with respect to the direction of travel of knives 63, 65. Such angles, FIG. 16, are different in that the cut made to produce the end surface 19 to be overlapped by the side surface adjacent the other end, slopes to provide an angularly extended surface for sealing, while the cut to be made to produce the other exposed end surface 18 is more nearly perpendicular in order to provide an edge projection for compression during heat sealing to provide a truly circular outer surface by compression and displacement of the film during heat sealing. The proper cut is assured by spacing knives 63, 65 from table 60 and lever 61 a distance to cut exactly at undercut portions 26, 27. After trimming, band 15 is removed from mold 24.

The third step of the encapsulation process simply comprises inserting an O-ring 12 in trimmed band 15.

The toroidal core comprising the O-ring 12 may be of any suitably elastomeric material such as rubber, natural or synthetic, having the desired properties of flexibility, resilience and temperature resistance, all as well understood by those skilled in the art. One preferred material for this purpose is vinylidene fluoride hexafluoropropylene known as Du Pont Viton. No consideration need be given to its resistance to chemical attack, however, so that no compromise need be made in that area. Its dimensions must of course be selected by taking into consideration the thickness of cover 15.

The final step of the encapsulation process comprises sealing together the trimmed opposing edges of band 15. To this end a sealing press 66 is provided for heat and pressure sealing of the edges.

The press 66 in general comprises a plurality of jaws together forming a semi-toroidal chamber embracing core 12 in band 15. A sealing platen closes the chamber to a toroidal configuration and seals the edges. The jaws, as shown in FIGS. 17–19 comprise first a mounting jaw 73 having a continuous mounting surface 72 which abuts a segment of the inner side of band 15 adjacent, but not over, inner sloped edge 19. As shown in FIG. 17 mounting jaw 73 includes a threaded axial projection 80 extending away from mounting surface 72. A support jaw 69 fits over threaded projection 80 and is fastened in place by nut lock means 81 on projection 80 after core 12 in band 15 is positioned on mounting jaw 73. Support jaw 69 includes continuous support surface 68 abutting the remaining segment of the inner surface of band 15 away from edge 19. After the support jaw 69 is locked on projection 80, clamping jaw 71, 71' is positioned against the outer surface of band 15. Clamping jaw 71, 71' is in two pieces in the form of a split ring, as shown in broken lines in FIG. 17. Clamping jaw 71, 71' includes clamping surface 70, 70' which, when the two pieces of jaw 71, 71' are positioned together, provides a continuous clamping surface abutting the outer surface of band 15 from support surface 68 to a point spaced from mounting surface 72 adjacent outer edge 18 of the band 15. Together surfaces 68, 70, 70' and 72 in section present a substantially continuous circular configuration conforming to the final desired configuration of band 15 around core 12.

The band 15 with core 12 therein thus clamped in jaws 69, 71, 71', and 73 has its ends held with the side surface adjacent outer end surface 18 overlying the sloping inner end surface 19 with a projecting edge 11 of the outer surface pointing upwardly around the upper axially facing surface of the core 12 as in FIG. 18 in the space between jaws 71, 71', and 73. A platen member 74 includes a platen adapted to fit in the space between jaws 71, 71', and 73 for abutting band 15 at projection 11 over ends 18, 19. Pressure surface 76 of platen 75 abuts the projection over the ends and is shaped to provide a toroidal chamber in connection with the other surfaces. When it is advanced as in FIG. 19, heating means 78 are provided in the platen member 74 for heating platen 75. At the outer perimeter of member 74 a downwardly extending flange portion 77 engages the outer edge of jaw 71, 71' to provide lock means for maintaining the relative position of said jaws. Hydraulic or other means (not shown) are provided for moving the platen pressure surface 76 against band 15.

In operation, after the band 15 and core 12 are clamped in position as described, platen surface 76 is advanced against projection 11 while heating to a thermoforming temperature. The heat and pressure seal the end 18, 19 of band 15 thereby encapsulating core 12 therewithin by a scarf joint 6 angularly extending between inner seam edge 8 and outer seam edge 9 and peripherally extending around a single axially facing surface of core 12 as in FIG. 19. Projection 11 is displaced and compressed as shown in FIG. 19 to provide a truly circular configuration of cover 15.

Figure 12:
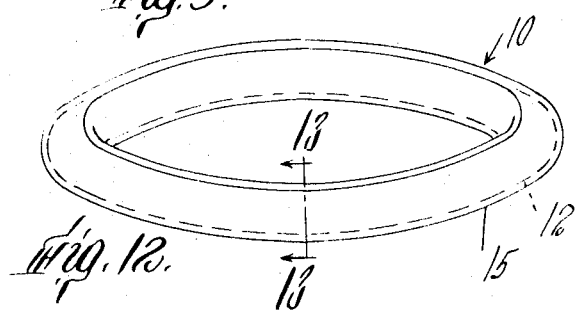
FIG. 12 is an enlarged isometric view of an encapsulated O-ring showing the overlapping cover edges sealed around one axially facing side in accordance with this invention.
Figure 13:
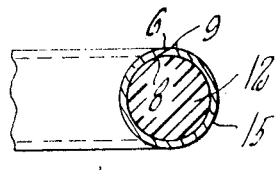
FIG. 13 is a section of an encapsulated O-ring taken along the line 13—13 of FIG. 12.

Referring to FIGS. 12 and 13, the completed O-ring will be seen to consist of an elastomeric toroidal core 12 of circular cross section with a fluid tight cover 15 of chemically resistant organic plastic sheet film material over its entire surface. Cover 15 is in the form of a continuous band with its peripherally abutting edges heat sealed together in overlapping relationship throughout the substantial extent of their overlapping surfaces providing a single sloping scarf joint generally designated 6 around an axially facing side of the completed O-ring, said joint having its inner seam edge 8 angularly spaced from its outer seam edge 9 to provide a truly circular cross section of a diameter greater than that of core 12 by precisely twice the thickness of the film material of cover 15. This heat and pressure sealing provides a single peripheral perfectly fluid tight overlapping scarf joint 6 between the ends of the cover 15 around the entire periphery of one axially facing side of the O-ring of the invention.

The O-ring of the invention is especially useful in mechanical seal structures, such as shown and described in Pat. Nos. 3,184,244 and 3,188,095, for unusual environment such as high chemical reactivity and the like.

What is claimed is:
1. The process of encapsulating an O-ring comprising the steps of:
  forming a sheet of organic thermoplastic material to provide in one plane two sheet portions spatially separated by a gap therebetween, with a continuous annular bead of said material to one side of said plane integral with said portions and bridging said gap, the portion of said bead remote from said plane having a generally C-shaped tubular cross section enlarged relative to said gap, providing a continuous annular generally C-shaped band to one side of organic thermoplastic sheet material;
  trimming said band from said sheet thereby forming continuous opposing edges of said band;
  inserting an O-ring in said band; and
  sealing together said opposing edges of said band thereby encapsulating said O-ring.
2. The process claimed in claim 1 in which said band is formed about a ring mold of generally circular cross section, said band is trimmed while on said ring mold, and said ring mold is removed from said band only after trimming prior to insertion of said O-ring.
3. The process of encapsulating an O-ring comprising the steps of:
  forming a sheet of organic thermoplastic material to provide in one plane two sheet portions spatially separated by a gap therebetween, one of said sheet portions surrounding the other of said sheet portions, and a continuous annular endless bead of said material to one side of said plane integral with said portions and bridging said gap, the portion of said bead remote from said plane having an enlarged generally tubular C-shaped cross section, and the portion of said bead intermediate and connecting said enlarged portion and said sheet portions having a reduced cross section relative to said enlarged portion defining at said plane said gap, providing a continuous annular generally C-shaped band to one side of organic thermoplastic material;
  trimming said band from said sheet thereby forming continuous opposing edges of said band;
  inserting an O-ring in said band; and
  sealing together said opposing edges of said band thereby encapsulating said O-ring.
4. The process claimed in claim 3 in which said gap is circular and said bead is semi-toroidal.
5. The process of encapsulating an O-ring comprising the steps of:
  forming about a ring mold of generally circular cross section, a continuous generally C-shaped band to one side of organic thermoplastic sheet material;
  trimming said band from said sheet while on said ring mold with an inner edge cut at an obtuse angle at the outer surface of said band for sealing contact with the inner surface of said band adjacent the outer edge thereof and with the outer edge substantially perpendicular, thereby forming continuous opposing edges of said band;
  removing said ring mold from said band only after trimming prior to insertion of said O-ring;
  thereafter inserting an O-ring in said band; and
  finally sealing together said opposing edges of said band thereby encapsulating said O-ring.
6. The process claimed in claim 5 in which prior to sealing said band with said O-ring therein is clamped with said outer edge inner surface overlying said inner edge sloped cut.
7. The process claimed in claim 6 in which said edges are sealed by heat and pressure to provide a scarf joint therebetween.

References Cited

UNITED STATES PATENTS

| | | | |
|---|---|---|---|
| 2,859,061 | 11/1958 | Reid | 277—228 |
| 3,336,424 | 8/1967 | Cheney | 264—93 |
| 3,337,664 | 8/1967 | Lyon | 264—93 |

REUBEN EPSTEIN, Primary Examiner

U.S. Cl. XR.

156—256, 306; 264—152; 277—228